US012010298B2

(12) United States Patent
 Chen et al.

(10) Patent No.: US 12,010,298 B2
(45) Date of Patent: Jun. 11, 2024

(54) MODEL PARAMETER DERIVATION OF LOCAL ILLUMINATION COMPENSATION IN THE LUMA MAPPING WITH CHROMA SCALING-MAPPED DOMAIN IN VIDEO CODING

(71) Applicant: QUALCOMM Incorporated, San Diego, CA (US)

(72) Inventors: Chun-Chi Chen, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/325,738

(22) Filed: May 30, 2023

(65) Prior Publication Data

US 2023/0308642 A1 Sep. 28, 2023

Related U.S. Application Data

(63) Continuation of application No. 17/356,153, filed on Jun. 23, 2021, now abandoned.

(Continued)

(51) Int. Cl.
 *H04N 7/12* (2006.01)
 *G06T 9/00* (2006.01)
 (Continued)

(52) U.S. Cl.
 CPC .......... *H04N 19/105* (2014.11); *G06T 9/004* (2013.01); *H04N 19/159* (2014.11);
 (Continued)

(58) Field of Classification Search
 CPC ..................................................... G06T 9/004
 See application file for complete search history.

(56) References Cited

U.S. PATENT DOCUMENTS

2021/0409683 A1 12/2021 Chen

FOREIGN PATENT DOCUMENTS

WO 2019006300 A1 1/2019

OTHER PUBLICATIONS

Bross B., et al., "Versatile Video Coding (Draft 9)", 130. MPEG Meeting, (Motion Picture Expert Group or ISO/IEC JTC1/SC29/WG11), Apr. 20, 2020-Apr. 24, 2020, Alpbach, 18th JVET Meeting, (ITU-T SG 16 WP 3 and ISO/IEC JTC 1/SC 29/WG11), Apr. 15, 2020-Apr. 24, 2020, No. JVET-R2001-vA, m53983, JVET-R2001, May 15, 2020 (May 15, 2020), XP030287936, 528 Pages, Sections 7.4.3.4. 7.4.8.1, Sections C.5.2.3, 7.4.3.9.

(Continued)

*Primary Examiner* — Y Lee
(74) *Attorney, Agent, or Firm* — Shumaker & Sieffert, PA

(57) ABSTRACT

An example device for decoding video data includes memory configured to store the video data and one or more processors implemented in circuitry and communicatively coupled to the memory. The one or more processors are configured to reshape a pixel domain reference template block using a forward mapping function into a mapped domain reference template block and derive local illumination compensation (LIC) model parameters from the mapped domain reference template block and a mapped domain neighboring reconstruction template block. The one or more processors are configured to apply the LIC model parameters to motion-compensated prediction signals and decode the video data based on the application of the LIC model parameters.

20 Claims, 14 Drawing Sheets

Related U.S. Application Data

(60) Provisional application No. 63/043,619, filed on Jun. 24, 2020.

(51) Int. Cl.

| | | |
|---|---|---|
| *H04N 19/105* | (2014.01) | |
| *H04N 19/159* | (2014.01) | |
| *H04N 19/176* | (2014.01) | |
| *H04N 19/186* | (2014.01) | |
| *H04N 19/189* | (2014.01) | |
| *H04N 19/51* | (2014.01) | |

(52) U.S. Cl.
CPC ......... *H04N 19/176* (2014.11); *H04N 19/186* (2014.11); *H04N 19/189* (2014.11); *H04N 19/51* (2014.11)

(56) References Cited

OTHER PUBLICATIONS

Chao Y-H., et al., "CE8-2.1: Palette Mode in HEVC", JVET-O0119, 15th JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0119, Jul. 9, 2019 (Jul. 9, 2019), XP030218670, 7 Pages, JVET-O0119-V3.

Chen J., et al., "Algorithm Description for Versatile Video Coding and Test Model 4 (VTM 4)", 125. MPEG Meeting (Motion Picture Expert Group or ISO/IEC JTC1/SC29/WG11), Jan. 14, 2019-Jan. 18, 2019, 13th JVET Meeting, ITU-T SG 16 WP 3 and ISO/IEC JTC 1/SC 29/WG 11, JVET-M1002-v1, Marrakech, MA No. m46628, Feb. 16, 2019 (Feb. 16, 2019), XP030215566, 60 pages, paragraphs [3.4.7], [3.4.9].

Chen J., et al., "Algorithm Description for Versatile Video Coding and Test Model 9 (VTM 9)", 130. MPEG Meeting, Apr. 20, 2020-Apr. 24, 2020, Alpbach, (Motion Picture Expert Group or ISO/IEC JTC1/SC29/WG11), No. m53984, 18th IVET Meeting, JVET of ITU-T SG 16 WP 3 and ISO/IEC JTC 1/SC 29/WG 11, Apr. 15-24, 2020, JVET-R2002-v2, Jun. 15, 2020 (Jun. 15, 2020), XP030289596, 97 Pages, pp. 80. 81, paragraph 3.7.3.1, Section 3.7.1.

Chen J., et al., "Algorithm Description for Versatile Video Coding and Test Model 9 (VTM 9)", JVET-R2002-v1, Joint Video Experts Team (JVET) of ITU-T SG 16 WP 3 and ISO/IEC JTC 1/SC 29/WG 11, 18th Meeting: by teleconference, Apr. 15-24, 2020, pp. 1-97.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

Fujibayashi A., et al., "TE12: Performance of Partition Based Illumination Compensation (PBIC)", 3rd JCT-VC Meeting, 94th MPEG Meeting, Jul. 10, 2010-Oct. 15, 2010, 3rd Meeting: Guangzhou, CN, (Joint Collaborative Team on Video Coding of ISO/IEC JTC1/SC29/WG11 and ITU-T SG. 16), WG-11No. m18062, URL: http://WFTP3.ITU.INT/AV-ARCH/JCTVC-SITE/, No. JCTVC-C041, Oct. 1, 2010 (Oct. 1, 2010), XP030007748, pp. 1-12, Section 2.

International Search Report and Written Opinion—PCT/US2021/038962—ISA/EPO—dated Oct. 5, 2021.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Minoo (Arris) K., et al., "Description of the Reshaper Parameters Derivation Process in ETM Reference Software", 23. JCT-VC Meeting, Feb. 19, 2016-Feb. 26, 2016, San Diego, USA, (Joint Collaborative Team on Video Coding of ITU-T SG 16 WP 3 and ISO/IEC JTC 1/SC 29/WG 11), URL: http://wftp3.itu.int/av-arch/jctvc-site/, No. JCTVC-W0031, Jan. 11, 2016 (Jan. 11, 2016), XP030117798, pp. 1-17, p. 10. paragraph 3.3.2 pp. 11. 12. paragraph 4.

Shingala (Ittiam) J.N., et al., "Non-CE4: LIC Model Parameters Using Forward Mapped Luma Samples in LMCS", 15. JVET Meeting, Jul. 3, 2019-Jul. 12, 2019, Gothenburg, SE, (The Joint Video Exploration Team of ISO/IEC JTC1/SC29/WG11 and ITU-T SG.16), No. JVET-O0190, M48297, Jun. 25, 2019 (Jun. 25, 2019), XP030218798, 5 Pages, pp. 1.2, figure 2.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Prosecution History from U.S. Appl. No. 17/356,153, dated Oct. 6, 2022 through Mar. 30, 2023, 32 pp.

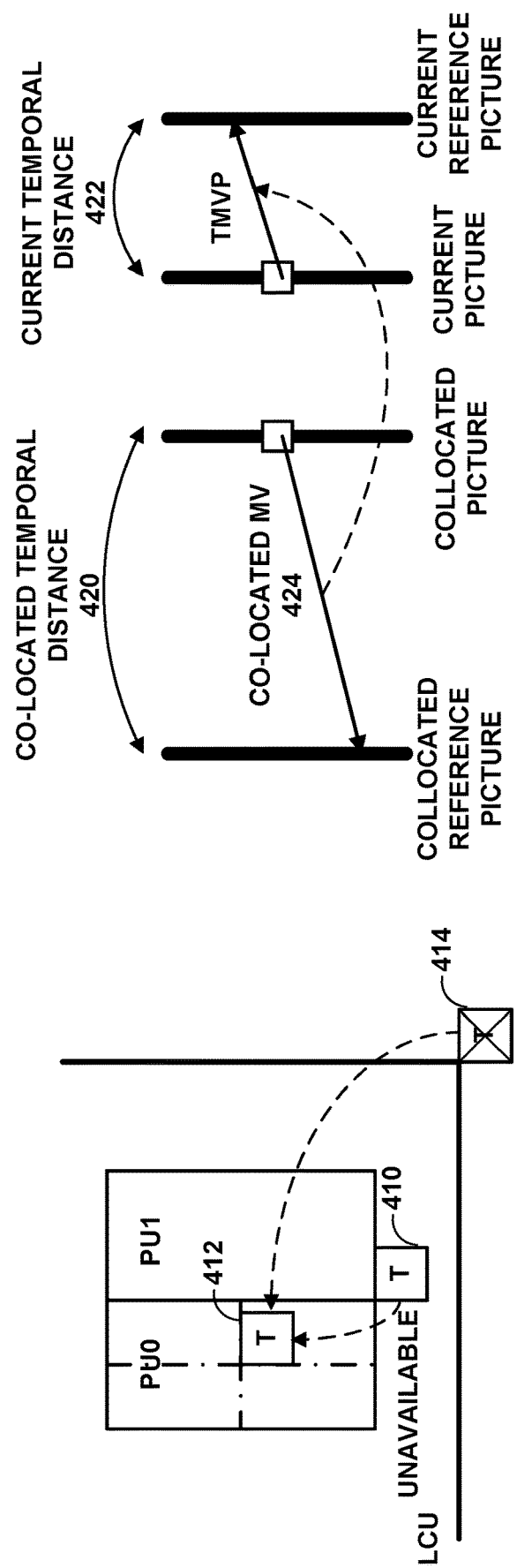

MODEL PARAMETER DERIVATION OF LOCAL ILLUMINATION COMPENSATION IN THE LUMA MAPPING WITH CHROMA SCALING-MAPPED DOMAIN IN VIDEO CODING

This application is a continuation of U.S. application Ser. No. 17/356,153, filed Jun. 23, 2021, which claims the benefit of U.S. Provisional Application No. 63/043,619, filed Jun. 24, 2020, the entire content of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for local illumination compensation (LIC) parameter derivation in a video coding process. In particular, this disclosure describes techniques for LIC parameter derivation in a luma mapping with chroma scaling (LMCS) mapped domain. The techniques of this disclosure may decrease decoding latency and increase decoding efficiency by removing the need to load an inverse mapping table from memory for LIC parameter derivation in LMCS.

In one example, a method includes reshaping a pixel domain reference template block using a forward mapping function into a mapped domain reference template block, deriving local illumination compensation (LIC) model parameters from the mapped domain reference template block and a mapped domain neighboring reconstruction template block, applying the LIC model parameters to motion-compensated prediction signals, and decoding the video data based on the application of the LIC model parameters.

In another example, a device includes memory configured to store the video data and one or more processors implemented in circuitry and communicatively coupled to the memory, the one or more processors being configured to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

In another example, a computer-readable storage medium stores instructions which, when executed, cause one or more processors to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

In another example, a device includes means for reshaping a pixel domain reference template block using a forward mapping function into a mapped domain reference template block; means for deriving local illumination compensation (LIC) model parameters from the mapped domain reference template block and a mapped domain neighboring reconstruction template block; means for applying the LIC model parameters to motion-compensated prediction signals; and means for decoding the video data based on the application of the LIC model parameters.one or more means for performing any of the techniques of this disclosure.

The details of one or more examples are set forth in the accompanying drawings and the description below. Other features, objects, and advantages will be apparent from the description, drawings, and claims.

BRIEF DESCRIPTION OF DRAWINGS

FIG. 6A is a conceptual diagram illustrating an example of a temporal motion vector prediction (TMVP) candidate.

FIG. 6B is a conceptual diagram illustrating an example of motion vector scaling.

DETAILED DESCRIPTION

In some example video decoders, when local illumination compensation (LIC) and luma mapping with chroma scaling (LMCS) are both enabled, LIC is the only inter prediction mode that requires loading an inverse look-up table at the coding unit (CU) level to convert reconstruction signals back to the pixel domain to then derive LIC model parameters. Unlike the Versatile Video Coding (VVC) standard, which requires loading this inverse table at the coding tree unit (CTU)/virtual pipeline data unit (VPDU)/picture level within the loop filtering stage, this additional inverse mapping at the CU level introduces additional hardware-implementation burden to the motion compensation module of a video decoder, resulting in potentially longer latency during this motion compensation stage.

According to the techniques of this disclosure, rather than use the inverse mapping at the CU level, a video decoder may derive LIC parameters based on a mapped domain reference template block and a mapped domain neighboring reconstruction template block. In this manner, the inverse mapping table may not be read from memory to derive the LIC parameters, which may save processing power and reduce decoding latency.

Figure 1:
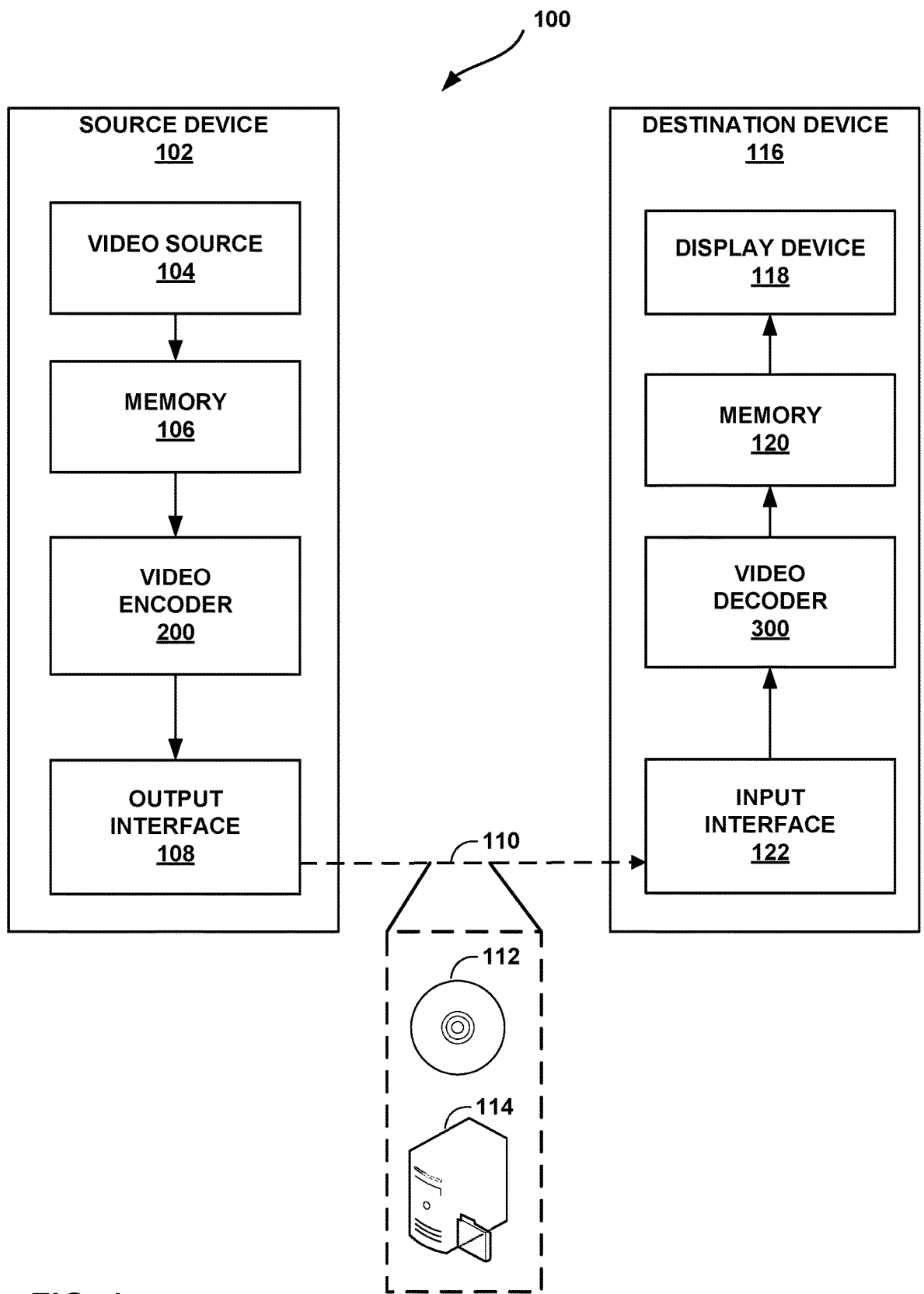
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for LIC parameter derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may be configured to perform techniques for LIC parameter derivation. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11,18$^{th}$ Meeting: by teleconference, 15-24 Apr. 2020, JVET-R2001-vA (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain, also referred to herein as the pixel domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes reshaping a pixel domain reference template block using a forward mapping function into a mapped domain reference template block; deriving local illumination compensation (LIC) model parameters from the mapped domain reference template block and a mapped domain neighboring reconstruction template block; applying the LIC model parameters to motion-compensated prediction signals; and decoding the video data based on the application of the LIC model parameters.

In accordance with the techniques of this disclosure, a device includes memory configured to store the video data and one or more processors implemented in circuitry and communicatively coupled to the memory, the one or more processors being configured to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

In accordance with the techniques of this disclosure, a computer-readable storage medium stores instructions which, when executed, cause one or more processors to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

In accordance with the techniques of this disclosure, a device includes means for reshaping a pixel domain reference template block using a forward mapping function into a mapped domain reference template block; means for deriving local illumination compensation (LIC) model parameters from the mapped domain reference template block and a mapped domain neighboring reconstruction template block; means for applying the LIC model parameters to motion-compensated prediction signals; and means for decoding the video data based on the application of the LIC model parameters.one or more means for performing any of the techniques of this disclosure.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
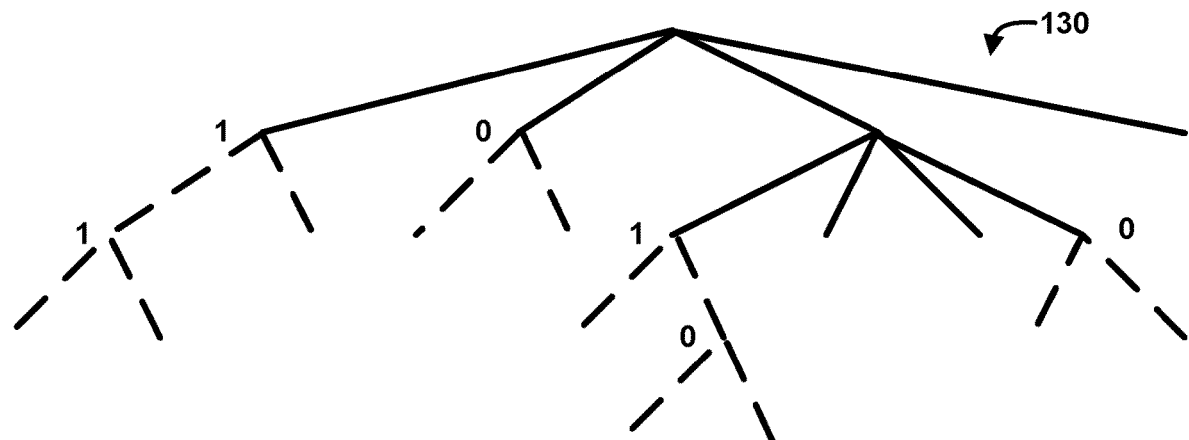
FIGS. 2A and 2B are conceptual diagrams illustrating an example quadtree binary tree (QTBT) structure, and a corresponding coding tree unit (CTU).
Figure 2B:
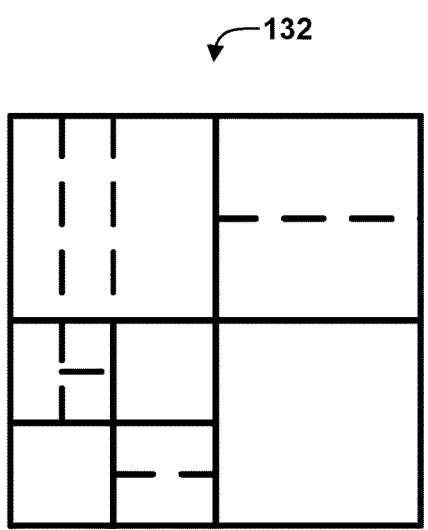

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
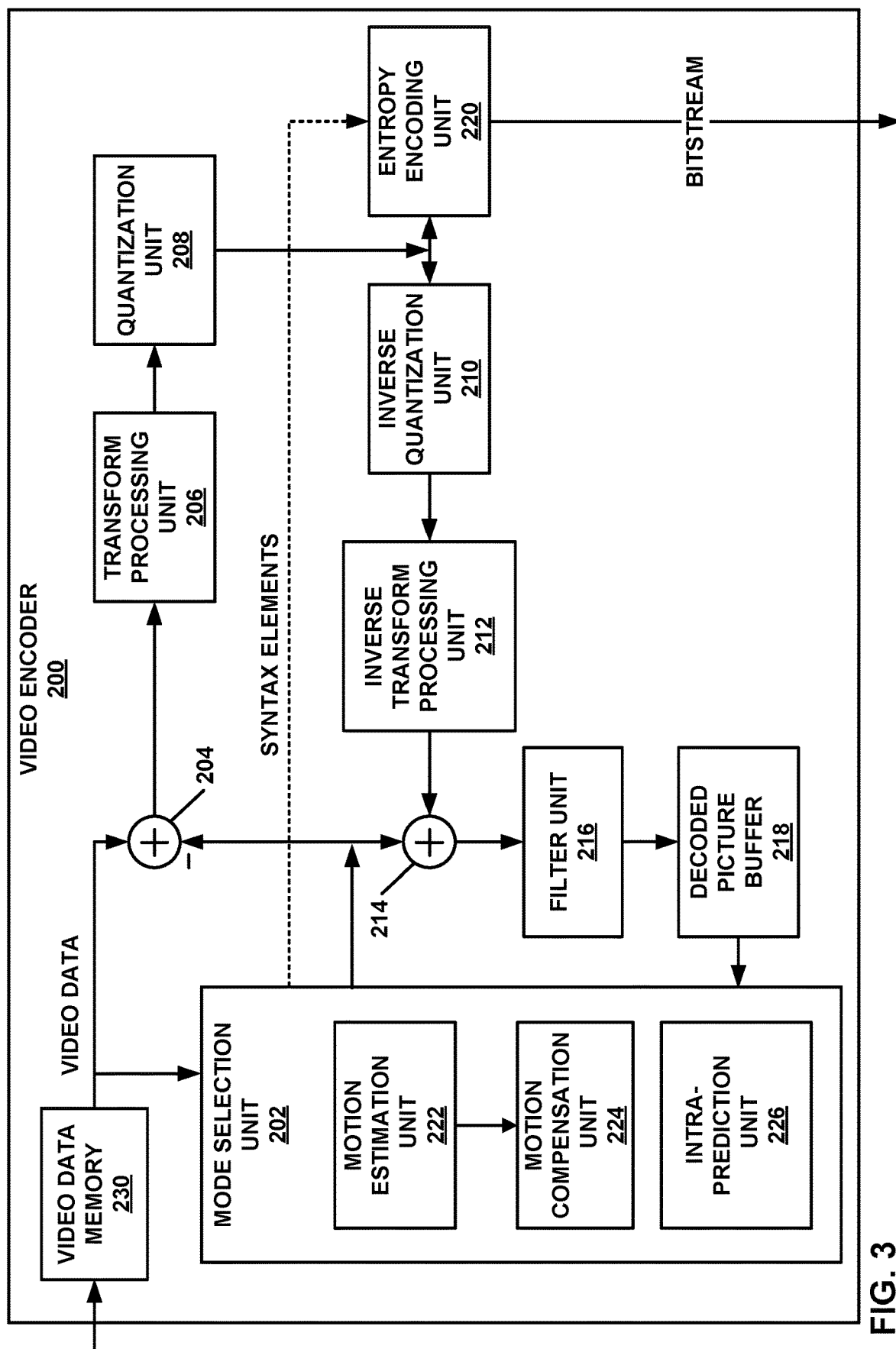
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
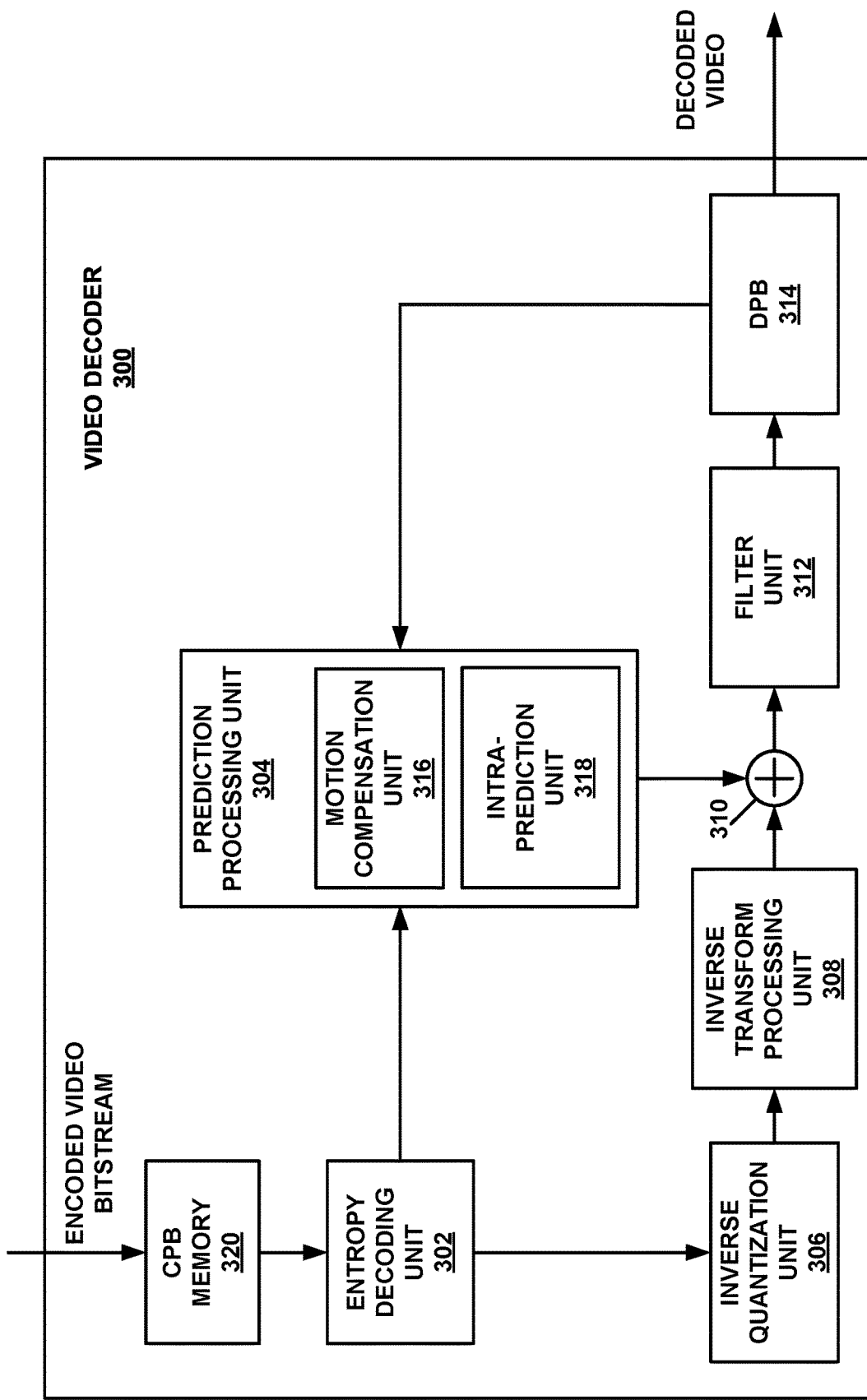
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In some examples, motion compensation unit 316 may use the inter coding tool LIC along with LMCS. In such examples, motion compensation unit 316 may reshape a pixel domain reference template block using a forward mapping function into a mapped domain reference template block. Motion compensation unit 316 may derive LIC model parameters from the mapped domain reference template block and a mapped domain neighboring reconstruction template block. Motion compensation unit 316 may apply the LIC model parameters to motion-compensated prediction signals.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to reshape a pixel domain reference template block using a forward mapping function into a mapped domain reference template block, derive local illumination compensation (LIC) model parameters from the mapped domain reference template block and a mapped domain neighboring reconstruction template block, apply the LIC model parameters to motion-compensated prediction signals, and decode the video data based on the application of the LIC model parameters.

As discussed above, this disclosure is related to local illumination compensation (LIC) in video coding. The techniques of this disclosure may be applied to any existing video codecs, such as HEVC (High Efficiency Video Coding), VVC (Versatile Video Coding), Essential Video Coding (EVC) or be an efficient coding tool in any future video coding standards. In the following section of this disclosure, HEVC techniques and work in VVC related to LIC are discussed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a newer video coding standard, namely High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are studying the potential need for standardization of future video coding technology with a compression capability that significantly exceeds that of the HEVC standard (including its current extensions and near-term extensions for screen content coding and high-dynamic-range coding). These two groups are working together on this exploration activity in a joint collaboration effort known as the Joint Video Exploration Team (JVET) to evaluate compression technology designs proposed by their experts in this area. The algorithm description of Versatile Video Coding and Test Model 9 (VTM 9) could also be referred to as JVET-R2002.

CU structure and motion vector prediction in HEVC are now discussed. In HEVC, the largest coding unit in a slice is a CTB or CTU. A CTB contains a quad-tree the nodes of which are coding units.

The size of a CTB can range from 16×16 to 64×64 in the HEVC main profile (although technically 8×8 CTB sizes can also be supported). A CU could be the same size of a CTB to as small as 8×8. Each CU is coded with one mode, e.g., inter or intra. When a CU is inter coded, the CU may be further partitioned into 2 or 4 PUs or become just one PU when further partitioning is not applied. When two PUs are present in one CU, they can be half size rectangles or two rectangles, one of which is ¼ the size of the CU and the other of which is ¾ the size of the CU. When a CU is inter coded, each PU has one set of motion information, which is derived with a unique inter prediction mode.

Motion vector prediction is now discussed. In the HEVC standard, there are two inter prediction modes, named merge (skip is considered as a special case of merge) and advanced motion vector prediction (AMVP) modes, respectively, for a PU.

In either AMVP or merge mode, an MV candidate list is maintained for multiple motion vector predictors. The MV(s), as well as reference indices in the merge mode, of the current PU, are generated by taking one candidate from the MV candidate list.

The MV candidate list may contain up to 5 candidates for the merge mode and two candidates for the AMVP mode. A merge candidate may contain a set of motion information, e.g., motion vectors corresponding to both reference picture lists (list 0 (L0) and list 1 (L1)) and the reference indices. If a merge candidate is identified by a merge index, video decoder 300 may determine the reference pictures used for the prediction of the current block, as well as the associated motion vectors. On the other hand, under AMVP mode for each potential prediction direction from either list 0 or list 1, a reference index needs to be explicitly signaled (e.g., by video encoder 200), together with an MV predictor (MVP) index to the MV candidate list since the AMVP candidate contains only a motion vector. In AMVP mode, the predicted motion vectors can be further refined. The candidates for both modes may be derived similarly from the same spatial and temporal neighboring blocks.

Figure 5B:
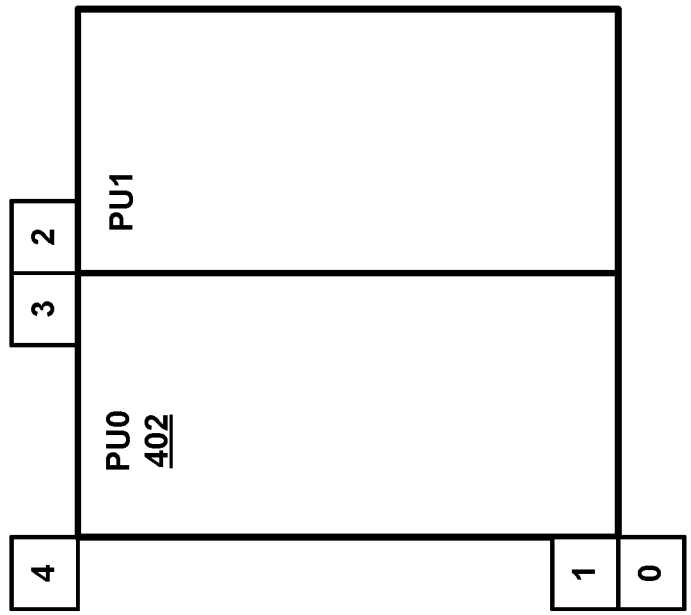
FIGS. 5A-5B are conceptual diagrams illustrating examples of spatial neighboring candidates for merge mode and advanced motion vector prediction (AMVP) mode, respectively.
Figure 5A:
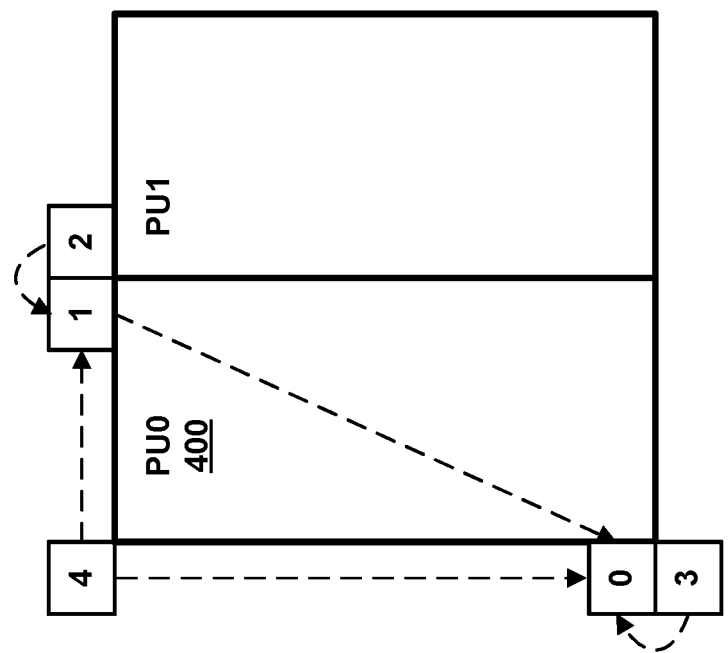

FIGS. 5A-5B are conceptual diagrams illustrating examples of spatial neighboring candidates for merge mode and advanced motion vector prediction (AMVP) mode, respectively. Spatial MV candidates may be derived from the neighboring blocks shown on FIGS. 5A-B, for a specific PU (PU0 400), although the techniques for generating the candidates from the blocks differ for merge and AMVP modes.

For example, in merge mode, video decoder 300 may derive up to four spatial MV candidates in the order shown in FIG. 5A. The order is as follows: left (0), above (1), above right (2), below left (3), and above left (4), as shown in FIG. 5A. For example, video encoder 200 or video decoder 300 may derive up to four spatial MV candidates in the order shown in FIG. 5A.

In AVMP mode, the neighboring blocks are divided into two groups: a left group consisting of the block 0 and 1 to the left of PU0 402, and an above group consisting of the blocks 2, 3, and 4 above PU0 402, as shown on FIG. 5B. For each group, the potential candidate in a neighboring block referring to the same reference picture as that indicated by the signaled reference index has the highest priority to be chosen to form a final candidate of the group. For example, video encoder 200 or video decoder 300 may select the candidate in a neighboring block referring to the same reference picture as that indicated by the signaled reference index to form a final candidate. In some cases, all neighboring blocks do not contain a motion vector pointing to the same reference picture. Therefore, if such a candidate cannot be found, video decoder 300 may scale the first available candidate to form the final candidate. In this manner, any temporal distance differences can be compensated.

Temporal Motion Vector Prediction in HEVC is now discussed. A temporal motion vector predictor (TMVP) candidate, if enabled and available, is added into the MV candidate list after spatial motion vector candidates. For example, video encoder 200 or video decoder 300 may add a TMVP candidate into the MV candidate list after the spatial motion vector candidates. The process of motion vector derivation for a TMVP candidate is the same for both merge and AMVP modes. However, in some examples, the target reference index for the TMVP candidate in the merge mode is set to 0.

FIG. 6A is a conceptual diagram illustrating an example of a temporal motion vector prediction (TMVP) candidate. The primary block location for TMVP candidate derivation is the bottom right block outside of the collocated PU as shown in FIG. 6A as a block "T" 410, to compensate for the bias to the above and left blocks used to generate spatial neighboring candidates. However, if that block is located outside of the current CTB row (e.g., block 414) or motion information is not available, video encoder 200 or video decoder 300 may substitute the center block 412 of the PU for the bottom right block outside of the collocated PU.

Video encoder 200 or video decoder 300 may derive the motion vector for the TMVP candidate from the co-located PU of the co-located picture, indicated in the slice level. The motion vector for the co-located PU is called a collocated MV.

FIG. 6B is a conceptual diagram illustrating an example of motion vector scaling. Similar to temporal direct mode in AVC, to derive the TMVP candidate motion vector, co-located MV 424 needs to be scaled to compensate for temporal distance differences, as shown in FIG. 6B. For example, current temporal distance 422 is different than co-located temporal distance 420. Therefore, video encoder 200 or video decoder 300 may scale co-located MV 424 in proportion to the differences in current temporal distance 422 and co-located temporal distance 420.

Other Aspects of Motion Prediction in HEVC are now discussed. Several aspects of merge and AMVP modes are described below. Motion vector scaling: the value of motion vectors is proportional to the distance of pictures in presentation time. A motion vector associates two pictures, the reference picture, and the picture containing the motion vector (e.g., the containing picture). When a motion vector is utilized to predict the other motion vector, video encoder 200 or video decoder 300 calculate the distance of the containing picture and the reference picture based on the Picture Order Count (POC) values.

For a motion vector to be predicted, both the motion vector's associated containing picture and reference picture may be different. Therefore, video encoder 200 or video decoder 300 may calculate a new distance (based on POC). Video encoder 200 or video decoder 300 scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, video encoder 200 or video decoder 300 generate artificial MV candidates and insert the artificial MV candidates at the end of the list until the MV candidate list has all the candidates (e.g., the list is full). In merge mode, there are two types of artificial MV candidates: combined candidates derived only for B-slices and zero candidates used only for AMVP if the first type does not provide enough artificial candidates to fill the MV candidate list.

For each pair of candidates that are already in the candidate list and have necessary motion information, bi-directional combined motion vector candidates are derived by a combination of the motion vector of the first candidate referring to a picture in list 0 and the motion vector of a second candidate referring to a picture in list 1.

The pruning process for candidate insertion is now discussed. Candidates from different blocks may happen to be the same, which decreases the efficiency of a merge/AMVP candidate list. A pruning process may be applied to solve this problem. For example, video encoder 200 or video decoder 300 may compare one candidate against the others in the current candidate list to avoid inserting identical candidates to a certain extent. To reduce the complexity, only limited pruning is applied instead of comparing each potential candidate with all the other existing candidates.

Local illumination compensation is now discussed. An overview of illumination compensation proposed for HEVC is presented. In JCTVC-0041, a partition-based illumination compensation (PBIC) was proposed. PBIC is different from weighted prediction (WP), for which video encoder 200 may indicate and signal parameters at a slice level. With PBIC, video encoder 200 may enable/disable PBIC and signal PBIC model parameters at a PU level to handle local illumination variation.

Similar to WP, illumination compensation (IC) also has a scaling factor (also denoted by a) and an offset (also denoted by b), and a right shift number which is fixed to be 6. An IC flag is coded (e.g., by video encoder 200) for each PU to indicate whether IC applies for a current PU or not. If IC applies for the current PU, video encoder 200 may signal a set of IC parameters (e.g., a and b) to video decoder 300 and video decoder 300 may use the set of IC parameters for motion compensation. In a bi-prediction case, video encoder 200 may signal two scaling factors (one for each prediction direction) and one offset. To save bits spent on IC parameters, a chroma component shares the scaling factors with a luma component and a fixed offset of 128 is used.

An overview of IC in 3D-HEVC is now provided. In 3D-HEVC, IC is enabled for inter-view prediction. IC in 3D-HEVC is different from WP and PBIC for which video encoder 200 signals IC parameters explicitly. For IC in 3D-HEVC, a video coder (e.g., video decoder 300) derives IC parameters based on neighboring samples of a current CU and neighboring samples of a reference block.

IC applies to 2N×2N partition mode only. For AMVP mode, video encoder 200 signals one IC flag for each CU that is predicted from an inter-view reference picture. For merge mode, to save bits, video encoder 200 signals an IC flag only when the merge index of the PU is not equal to 0. IC does not apply to a CU that is only predicted from temporal reference pictures.

The linear IC model used in inter-view prediction is shown in Eq. (1):

$$p(i,j)=a*r(i+dv_x,j+dv_y+b), \text{ where}(i,j) \in PU_c \qquad (1)$$

Here, $PU_c$ is the current PU, (i,j) is the coordinate of pixels in $PU_c$, $(dv_x, dv_y)$ is the disparity vector of $PU_c$. p(i, j) is the prediction of $PU_c$, r is the PU's reference picture from neighboring view, and a and b are parameters of the linear IC model.

Figure 7:
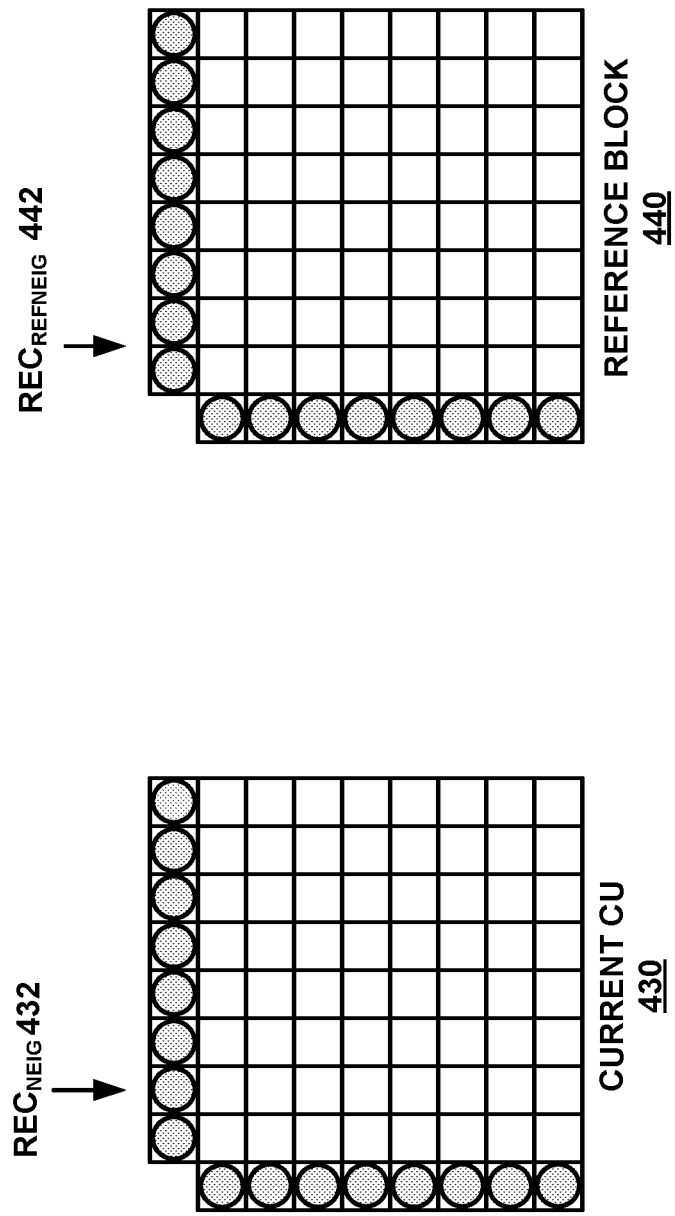
FIG. 7 is a conceptual diagram illustrating examples of neighboring pixels used to estimate parameters in an illumination compensation (IC) model with the reference block of the current block being found by using the current prediction unit's (PU) disparity vector.

FIG. 7 is a conceptual diagram illustrating examples of neighboring pixels used to estimate parameters in an IC model with the reference block of the current block being found by using a disparity vector of the current PU. To estimate parameters a and b for a PU, video decoder 300 use two set of pixels as shown in FIG. 7:

1) available reconstructed neighboring pixels in the left column and above row of current CU 430 (the CU that contains current PU) (indicated through grey circles); and
2) Corresponding neighboring pixels of current CU's reference block 440 (indicated through grey circles). A reference block of the current CU is found by using a disparity vector of the current PU.

For example, $Rec_{neig}$ 432 and $Rec_{refneig}$ 442 denote a used neighboring pixel set of current CU 430 and reference block 440 of current CU 430, respectively, and 2N denotes the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \qquad (1)$$

$$b = \frac{\sum_{i=0}^{2N-1} Rec_{neig}(i) - a \cdot \sum_{i=0}^{2N-1} Rec_{refneig}(i)}{2N} \qquad (2)$$

In some cases, only a is used in a linear model and b is always set equal to 0, or only b is used and a is always set equal to 1. For example, video encoder 200 or video decoder 300 may use only a in a linear model or use only b.

Local illumination compensation (LIC) in JVET is now discussed. LIC is based on a linear model for illumination changes, using a scaling factor a (with a shift number fixed to be 6) and an offset b. LIC is enabled or disabled adaptively for each inter-mode coded coding unit (CU).

Figure 8:
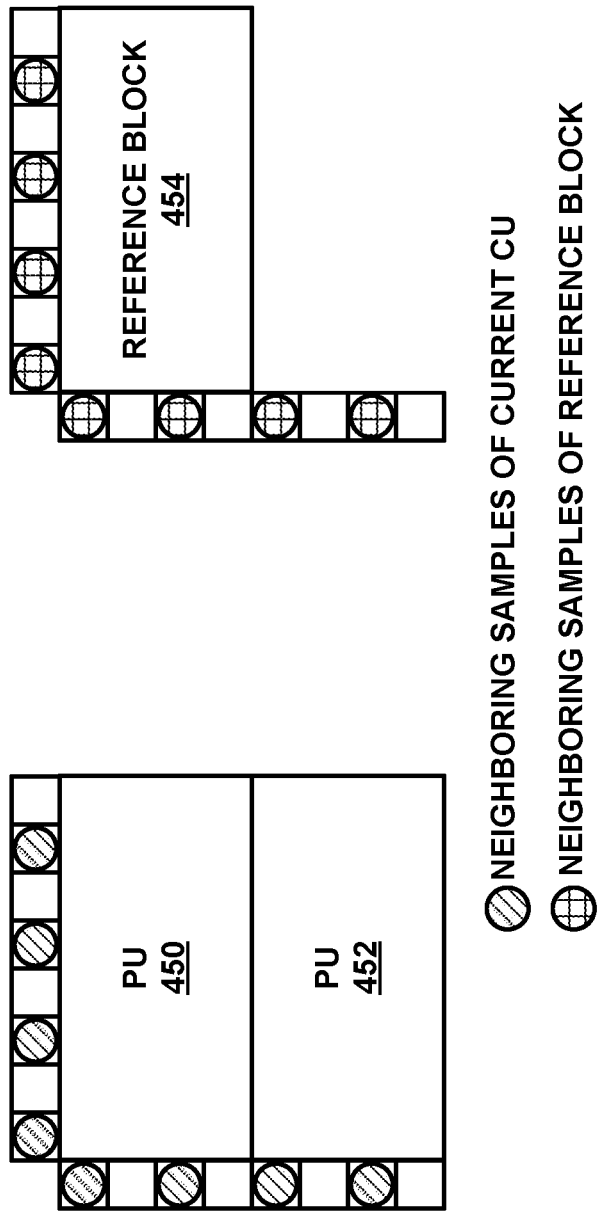
FIG. 8 is a conceptual diagram illustrating examples of neighboring samples used for deriving IC parameters.

FIG. 8 is a conceptual diagram illustrating examples of neighboring samples used for deriving IC parameters. When LIC applies for a CU, video encoder 200 or video decoder 300 employ a least square error method to derive the parameters a and b by using the neighboring samples of the current CU and their corresponding reference samples. More specifically, as illustrated in FIG. 8, the subsampled (2:1 subsampling) neighboring samples (shown as circles with slashes) of the CU and the corresponding pixels (shown as circles with a checkboard pattern and identified by motion information of the current CU or sub-CU) in the reference picture are used. The IC parameters are derived and applied for each prediction direction separately. For example, PU 450 and PU 452 are depicted as well as subsampled neighboring samples of the current CU (which includes PU 450 and PU 452). Reference block 454, which is the reference block for PU 450 in list0, and subsampled neighboring samples of reference block 454 are also shown.

When a CU is coded with merge mode, the LIC flag is copied from neighboring blocks, in a way similar to motion information copy in merge mode. When a CU is otherwise encoded (e.g., not using merge mode), video encoder 200 signals an LIC flag to video decoder 300 to indicate whether LIC applies or not.

Weighted prediction (WP) is now discussed. In HEVC, WP is supported, where a scaling factor (denoted by a), a shift number (denoted by s) and an offset (denoted by b) are used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, video encoder 200 signals a flag to be received by video decoder 300 to indicate whether WP applies for the reference picture or not. If WP applies for one reference picture, video encoder 200 sends a set of WP parameters (e.g., a, s and b) to video decoder 300 and video decoder 300 uses the set of WP parameters for motion compensation from the reference picture. To flexibly turn on/off WP for luma and chroma components, video encoder 200 may separately signal WP flag and WP parameters for luma and chroma components. In WP, one same set of WP parameters is used for all pixels in one reference picture.

Figure 9:
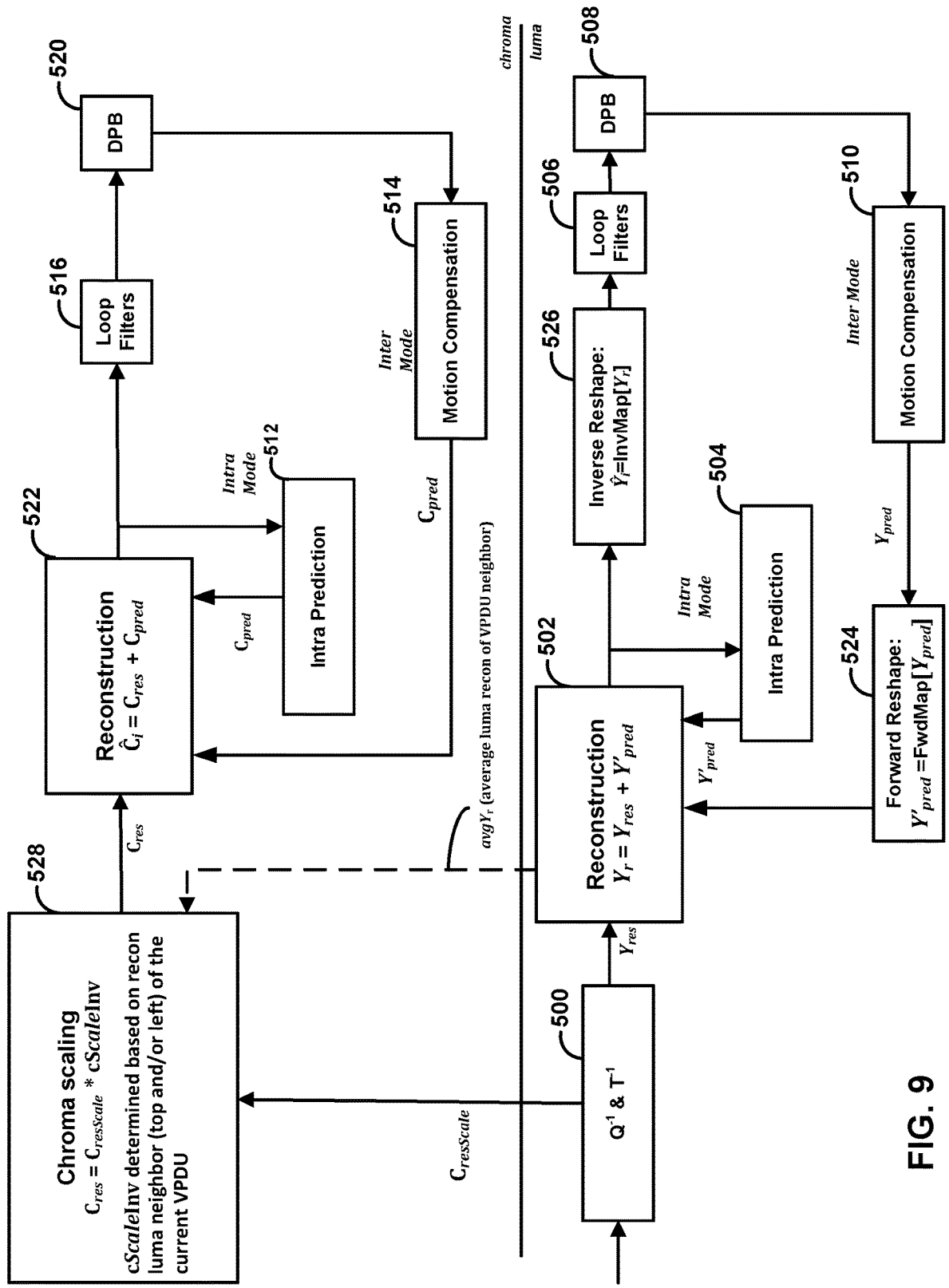
FIG. 9 is a block diagram illustrating an example luma mapping with chroma scaling (LMCS) architecture.

FIG. 9 is a block diagram illustrating an example luma mapping with chroma scaling (LMCS) architecture. In VVC, a coding tool called LMCS is added as a new processing block before the loop filters. LMCS has two main components: 1) in-loop mapping of the luma component based on adaptive piecewise linear models; 2) for the chroma components, luma-dependent chroma residual scaling is applied. FIG. 9 shows the LMCS architecture from the perspective of a decoder, such as video decoder 300. For example, video decoder 300 may implement LMCS as depicted in FIG. 9. For example, video decoder 300 may process the inverse quantization and inverse transform 500, perform luma intra prediction 504 and add the luma prediction together with the luma residual in reconstruction 502 in the mapped domain. Video decoder 200 may process loop filters 506 and 516 (such as deblocking filter, adaptive loop filter, and sample adaptive offset), perform motion compensated 510 and 514, perform chroma intra prediction 512, add the chroma prediction together with the chroma residual 522, and store decoded pictures as reference pictures 508 and 520 in the original (e.g., non-mapped) domain. Forward mapping of the luma signal in forward reshape 524, inverse mapping of the luma signal in inverse reshape 526, and a luma-dependent chroma scaling process 528 are LMCS functional blocks. Like most other tools in VVC, video encoder 200 can enable/disable LMCS at the sequence level using an SPS flag.

Luma mapping with a piecewise linear model is now discussed. The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. Video encoder 200 signals the FwdMap function using a piecewise linear model with 16 equal pieces. The InvMap function does not need to be signaled as video decoder 300 may derive the InvMap function from the FwdMap function.

Video encoder 200 signals the luma mapping model in the adaptation parameter set (APS) syntax structure with aps_params_type set equal to 1 (LMCS_APS). Up to four LMCS APS's may be used in a coded video sequence. In this example, only one LMCS APS may be used for a picture. Video encoder 200 may signal the luma mapping model using the piecewise linear model. The piecewise linear model partitions the input signal's dynamic range into 16 equal pieces, and for each piece, the linear mapping parameters of the piece may be expressed using the number of codewords assigned to that piece. For example, with a 10-bit input, each of the 16 pieces will have 64 codewords assigned to the piece by default. The signaled number of codewords is used to calculate the scaling factor and adjust the mapping function accordingly for that piece. At the slice level, video encoder 200 signals an LMCS enable flag to indicate if the LMCS process as depicted in FIG. 9 is applied to the current slice. If LMCS is enabled for the current slice, video encoder 200 signals an aps_id in the slice header to identify the APS that carries the luma mapping parameters.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):
1) OrgCW=64
2) For i=0:16, InputPivot[i]=i*OrgCW
3) For i=0:16, MappedPivot[i] is calculated as follows:
MappedPivot[0]=0;
for(i=0; i<16; i++)
MappedPivot[i+1]=MappedPivot[i]+SignalledCW[i]
where SignalledCW[i] is the signaled number of codewords for the i-th piece.

In FIG. 9, forward reshape 524 and inverse reshape 526 are shown. These boxes represent the forward reshaping of data from the pixel domain (also called the original domain) to a mapped domain and the inverse reshaping of data from the mapped domain to the pixel domain, respectively. As shown in FIG. 9, for an inter-coded block, motion-compensated prediction (e.g., motion compensation 510) is performed in the original domain and then the motion-compensated prediction signal is converted to the mapped domain (e.g., by forward reshape 524). In other words, after the motion-compensated prediction block $Y_{pred}$ is calculated based on the reference signals in DPB 508, video decoder 300 applies the FwdMap function (e.g., forward reshape 524) to map or reshape the luma prediction block in the original domain to the mapped domain, $Y'_{pred}$=FwdMap $(Y_{pred})$. For an intra-coded block, the FwdMap function is not applied because intra prediction 504 is performed in the mapped domain. After reconstructed block $Y_r$ is calculated, video decoder 300 applies the InvMap function (e.g., inverse reshape 526) to convert the reconstructed luma values in the mapped domain back to the reconstructed luma values in the original domain ($\hat{Y}_i$=InvMap($Y_r$)). The InvMap function (e.g., inverse reshape 526) is applied to both intra- and inter-coded luma blocks.

The luma mapping process (forward and/or inverse mapping) can be implemented using either look-up-tables (LUTs) or using on-the-fly computation. If LUTs are used, then FwdMapLUT and InvMapLUT can be pre-calculated and pre-stored for use at the tile group level, and forward and inverse mapping can be simply implemented as FwdMap $(Y_{pred})$=FwdMapLUT[$Y_{pred}$] and InvMap($Y_r$)=InvMapLUT[$Y_r$], respectively. Alternatively, on-the-fly computation may be used. Take forward mapping function FwdMap as an example. In order to determine the piece to which a luma sample belongs, video decoder 300 may right shift the sample value by 6 bits (which corresponds to 16 equal pieces). Then, video decoder 300 may retrieve the linear model parameters for that piece and apply the linear model parameters on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function may be as follows:

$$\text{FwdMap}(Y_{pred}) = ((b2-b1)/(a2-a1))*(Y_{pred}-a1)+b1 \quad (4)$$

The InvMap function can be computed on-the-fly in a similar manner. Generally, the pieces in the mapped domain are not of equal size. Therefore, the most straightforward inverse mapping process would require video decoder 300 to make comparisons in order to determine to which piece the current sample value belongs. Such comparisons increase decoder complexity. For this reason, VVC imposes a bitstream constraint on the values of the output pivot points MappedPivot[i] as follows. Assume the range of the mapped domain (for 10-bit video, this range is [0, 1023]) is divided into 32 equal pieces. If MappedPivot[i] is not a multiple of 32, then MappedPivot[i+1] and MappedPivot[i] cannot belong to the same piece of the 32 equal-sized pieces, e.g., MappedPivot[i+1]>>(BitDepthY−5) shall not be equal to MappedPivot[i]>>(BitDepthY−5). Thanks to such a bitstream constraint, the InvMap function can also be carried out using a simple right bit-shift by 5 bits (which corresponds to 32 equal-sized pieces) in order to determine the piece to which the sample value belongs.

Luma-dependent chroma residual scaling is now discussed. Chroma residual scaling is designed to compensate for the interaction between the luma signal and the luma signal's corresponding chroma signals. Video encoder 200 signals whether chroma residual scaling is enabled or not at the slice level. If luma mapping is enabled, video encoder 200 signals an additional flag to indicate if luma-dependent chroma residual scaling is enabled or not. When luma mapping is not used, luma-dependent chroma residual scaling is disabled. Further, luma-dependent chroma residual scaling is always disabled for chroma blocks whose area is less than or equal to 4.

Chroma residual scaling depends on the average value of top and/or left reconstructed neighboring luma samples of the current virtual pipeline data unit (VPDU). If the current CU is inter 128×128, inter 128×64, or inter 64×128, then video decoder 300 uses the chroma residual scaling factor derived for the CU associated with the first VPDU for all chroma transform blocks in that CU. Denote avgYr as the average of the reconstructed neighboring luma samples (see FIG. 9). Video decoder 300 computes the value of $C_{scaleInv}$ through the following steps:

1) Find the index $Y_{Idx}$ of the piecewise linear model to which avgYr belongs based on the InvMap function.
2) $C_{ScaleInv}$=cScaleInv[$Y_{Idx}$], where cScaleInv[ ] is a 16-piece LUT pre-computed table based on the value of SignalledCW[i] and an offset value signaled in the APS for chroma residual scaling process.

Unlike luma mapping, which is performed on a sample basis, $C_{ScaleInv}$ is a constant value for the entire chroma block. With $C_{ScaleInv}$, chroma residual scaling is applied as follows:

Video encoder 200: CResscale=CRes*CScale=CRes/CscaleInv

Video decoder 300: CRes=CResscale/Cscale=CResscale*CScaleInv

Figure 10:
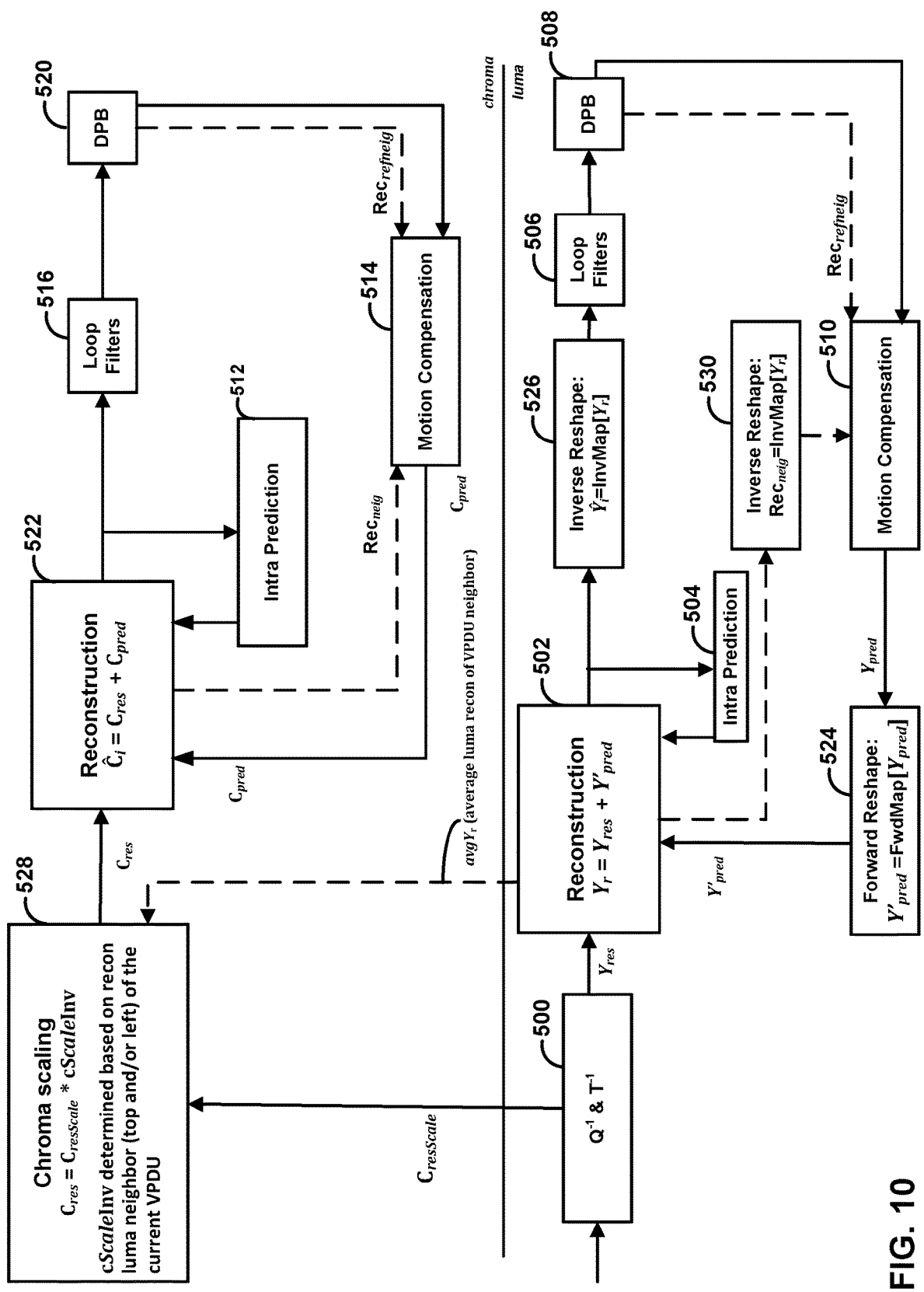
FIG. 10 is a block diagram illustrating an example LMCS architecture when local illumination compensation (LIC) is used.

FIG. 10 is a block diagram illustrating an example LMCS architecture when local illumination compensation (LIC) is used. In the example of FIG. 10 similar blocks as those in FIG. 9 are numbered the same. When LMCS is enabled, the neighboring reconstruction samples ($Rec_{neig}$) of the luma component relative to the current CU need to be converted back from the mapped domain to the pixel domain before motion compensation operates. FIG. 10 shows the LMCS architecture with LIC enabled. In the luma motion compensation loop, video decoder 300 may use an inverse lookup table at the CU level to map reconstructed luma signals (Yr) back to the pixel domain (denoted as $Rec_{neig}$) before video decoder 300 can derive the LIC model parameters a and b in the pixel domain. This inverse mapping is represented by inverse reshape 530 between the reconstruction 502 and the motion compensation 510.

When LIC and LMCS are both enabled, LIC is the only inter prediction mode that requires a video coder, such as video decoder 300, to load the inverse look-up table at the CU level to convert reconstruction signals back to the pixel domain for LIC model parameter derivation, as LMCS is a picture level tool. Unlike the standardization of VVC which requires loading this inverse table at the CTU/VPDU/Picture level within the loop filtering stage, this additional inverse mapping at the CU level would introduce additional hardware-implementation burden to the motion compensation module of video decoder 300, resulting in potentially longer latency during this motion compensation stage.

Figure 11:
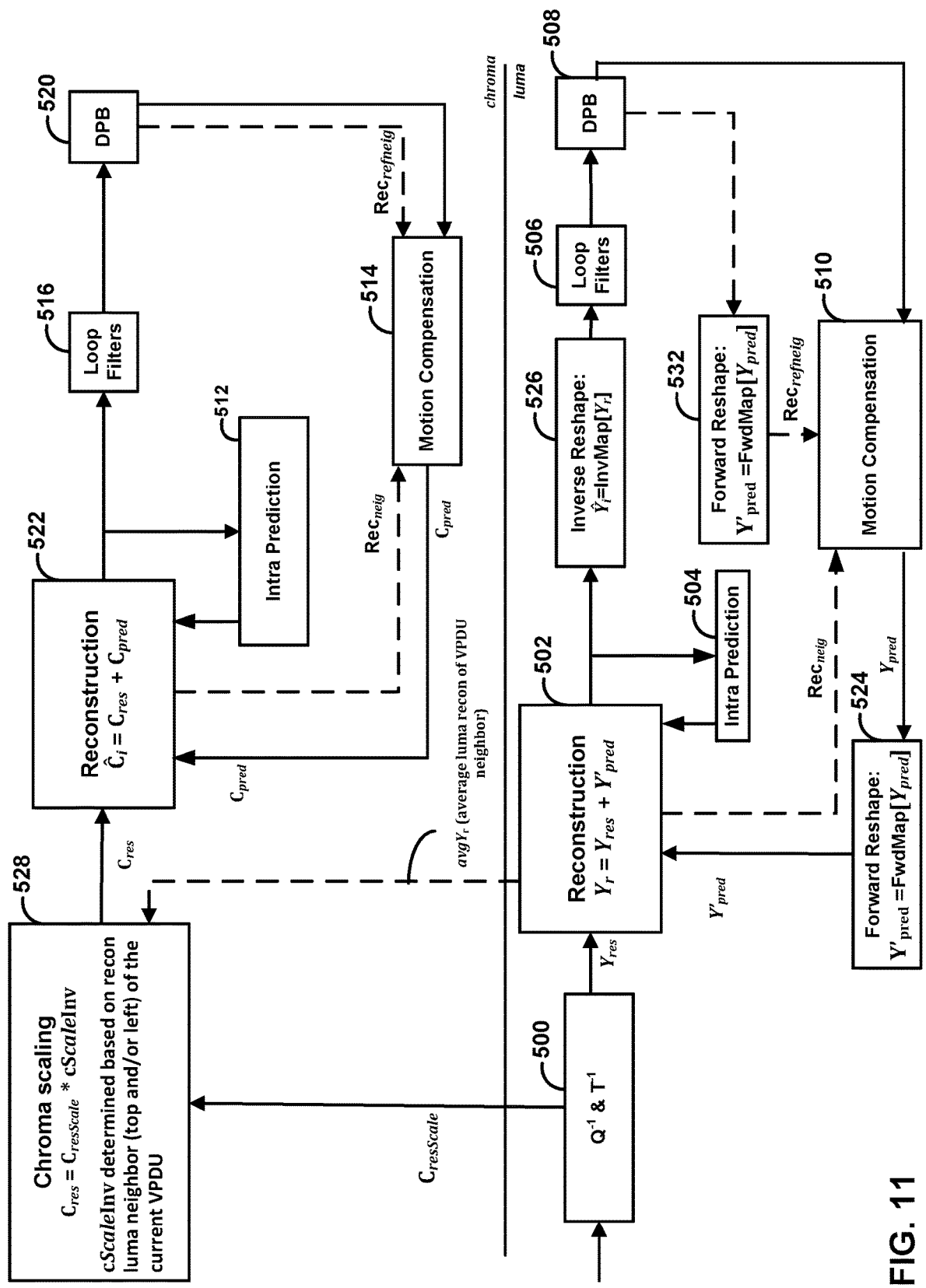
FIG. 11 is a block diagram illustrating an example LMCS architecture when LIC is used according to the techniques of this disclosure.

FIG. 11 is a block diagram illustrating an example LMCS architecture when LIC is used according to the techniques of this disclosure. In the example of FIG. 11 similar blocks as those in FIG. 9 are numbered the same. LIC model parameter derivation in an alternative domain is now discussed. According to the techniques of this disclosure, video decoder 300 may use the same derivation process of LIC parameters, but apply the derivation process directly in the mapped domain. Video decoder 300 may apply the resulting model parameters directly to the motion-compensated samples in the pixel domain. For example, the CU-level forward lookup table may be used to convert or reshape a pixel domain reference template block from the pixel domain to the mapped domain to determine a mapped domain reference template block. For example, video decoder 300 may use a forward mapping function (e.g., forward reshape 532) to reshape the pixel domain reference template block to a mapped domain reference template block. As FIG. 11 shows, the mapped-domain reference template block (e.g., shown exiting forward reshape 532 and entering motion compensation 510) and the mapped-domain neighboring reconstruction template block (e.g., shown exiting reconstruction 502 and entering motion compensation 510) are both used as if they were operating on pixel-domain signals to derive the LIC model parameters a and b. For example, both $Recref_{neig}$ and $Rec_{neig}$ are input to motion compensation 510, unlike the example of FIG. 9. The derived model parameters (together with the shift number that is equal to N, where N is an integer number (an integer shift), e.g., 6) are applied to the motion-compensated prediction signals in the pixel domain by motion compensation 510. As a result, the inverse lookup table at the CU level can be avoided completely, which may decrease the latency and improve the decoding efficiency of video decoder 300. For example, video decoder 300 may use a mapped-domain reference template block and the mapped-domain neighboring reconstruction template block as if they were operating on pixel-domain signals to derive the LIC model parameters a and b. Video decoder 300 may apply the LIC model parameters a and b to the motion-compensated prediction signals in the pixel domain.

In another example, video decoder 300 may apply the derived model parameters to mapped motion-compensated prediction signals, instead of being applied to pixel-domain motion-compensated prediction signals.

The same techniques of LIC model parameter derivation in the mapped domain can be extended to other dynamic range mappings (denoted as an alternative domain). Given a forward and inverse mapping function for the dynamic range mapping, the same architecture as the aforementioned architecture of FIG. 11 can be applied directly. For example, video decoder 300 may use a gamma function FwdMap(x)=A*$x^r$ as the forward mapping function, where A and r are constant values, respectively. For example, the mapping functions can also be of polynomial form, such as FwdMap(x)=$\Sigma i\epsilon$\{0,1, . . . , n\} $a_i x^i$ for forward mapping, where $a_i$, represents a real number which is a coefficient of the polynomial function of x. Such coefficients may be trained on a frame-by-frame basis and be signaled in an APS. The inverse mapping function can be easily derived based on backward querying by FwdMap(x). For example, FwdMap($x_0$) FwdMap($x_1$), . . . and FwdMap($x_i$) are all mapped to a certain value, e.g., $y_j$, then video decoder 300 may determine one of the entries in inverse function InvMap ($y_j$) to be one of the $x_0$, $x_1$, . . . and $x_i$, or a weighted average of them.

Figure 12:
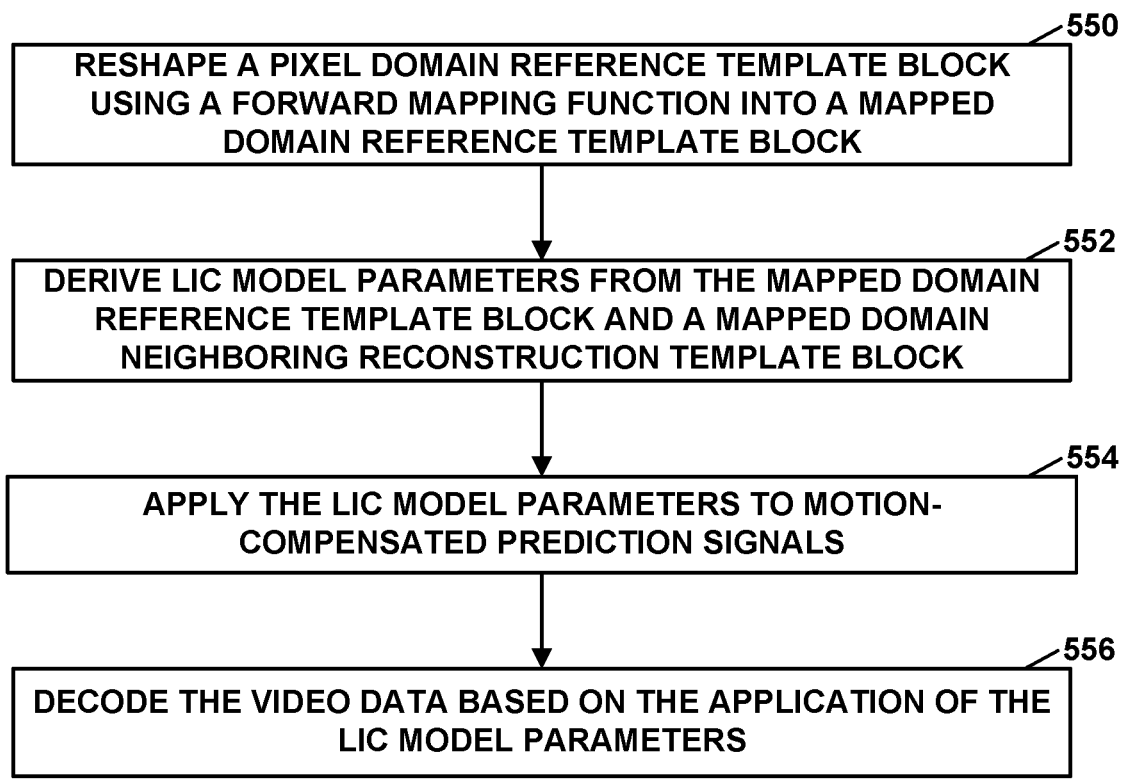
FIG. 12 is a flowchart illustrating LIC parameter derivation techniques according to this disclosure.

FIG. 12 is a flowchart illustrating LIC parameter derivation techniques according to this disclosure. Video decoder 300 may reshape a pixel domain reference template block using a forward mapping function into a mapped domain reference template block (550). For example, video decoder 300 may map luma components of a reference template block using LMCS to create a mapped domain reference template block. Video decoder 300 may derive LIC model parameters from the mapped domain reference template block and a mapped domain neighboring reconstruction template block (552). For example, rather than load an inverse mapping table from memory, video decoder 300 may determine an inverse mapping function based on the table and apply the inverse mapping function to the mapped domain reference template block and the mapped domain neighboring reconstruction template block before deriving the LIC parameters, video decoder 300 may derive the LIC parameters based on the mapped domain reference template block and a mapped domain neighboring reconstruction template block.

Video decoder 300 may apply the LIC model parameters to motion-compensated prediction signals (554). For example, video decoder 300 may apply the LIC model parameters to prediction samples after video decoder 300 motion compensates the prediction samples.

Video decoder 300 may decode the video data based on the application of the LIC model parameters (556). For example, video decoder 300 may decode the LIC-compensated motion-compensated prediction signals.

In some examples, applying the LIC model parameters further includes applying an integer shift to the motion-compensated prediction signals. In some examples, the integer shift is a right shift by 6.

In some examples, the motion-compensated prediction signals are in the pixel domain. In some examples, the motion-compensated prediction signals are in the mapped domain.

In some examples, the forward mapping function includes $FwdMap(Y\_pred)=((b2-b1)/(a2-a1))*(Y\_pred-a1)+b1$, where Y_pred is a luma prediction signal, i is a piece index, a1 is an input pivot point of i, a2 is an input pivot point of i+1, b1 is a mapped pivot point of i, and b2 is a mapped pivot point of i+1. In some examples, the forward mapping function includes a gamma function. In some examples, the gamma function includes $FwdMap(x)=A*x^r$, where A and r are constant values. In some examples, the forward mapping function comprises a polynomial function. In some examples, the polynomial function comprises $FwdMap(x)=\Sigma i \in \{0,1,\ldots,n\}\, a_i x^i$, where $a_i$ represents a real number which is a coefficient of the polynomial function of x.

In some examples, the LIC model parameters are applied on a coding unit (CU) basis. For example, video decoder 300 may apply the LIC model parameters on a coding unit basis. In some examples, video decoder 300 may determine that luma mapping with chroma scaling is enabled for the CU.

Figure 13:
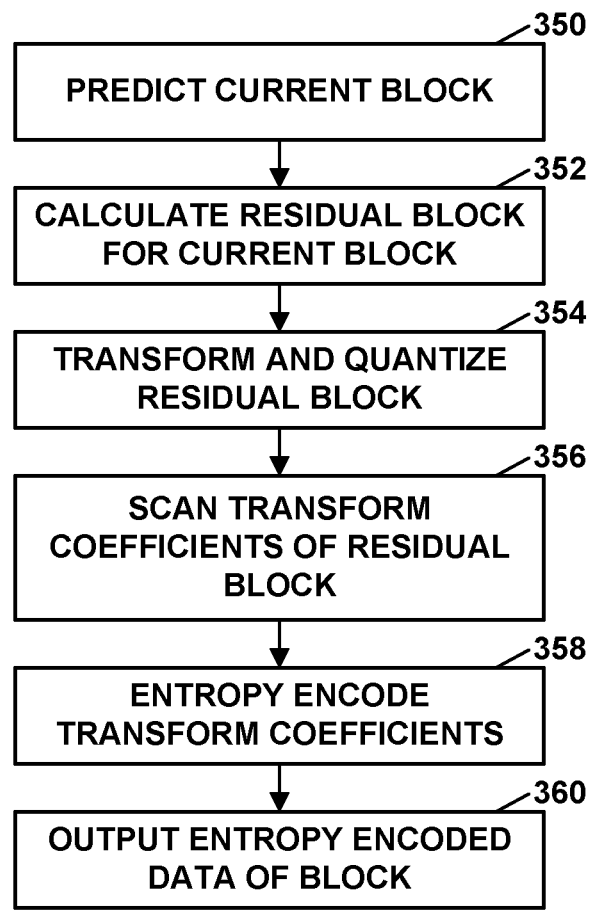
FIG. 13 is a flowchart illustrating an example method for encoding a current block in accordance with the techniques of this disclosure.

FIG. 13 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 13.

In this example, video encoder 200 initially predicts the current block (350). For example, video encoder 200 may form a prediction block for the current block. Video encoder 200 may, for example, form the prediction block using any of the various LIC and LMCS techniques described above. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 14:
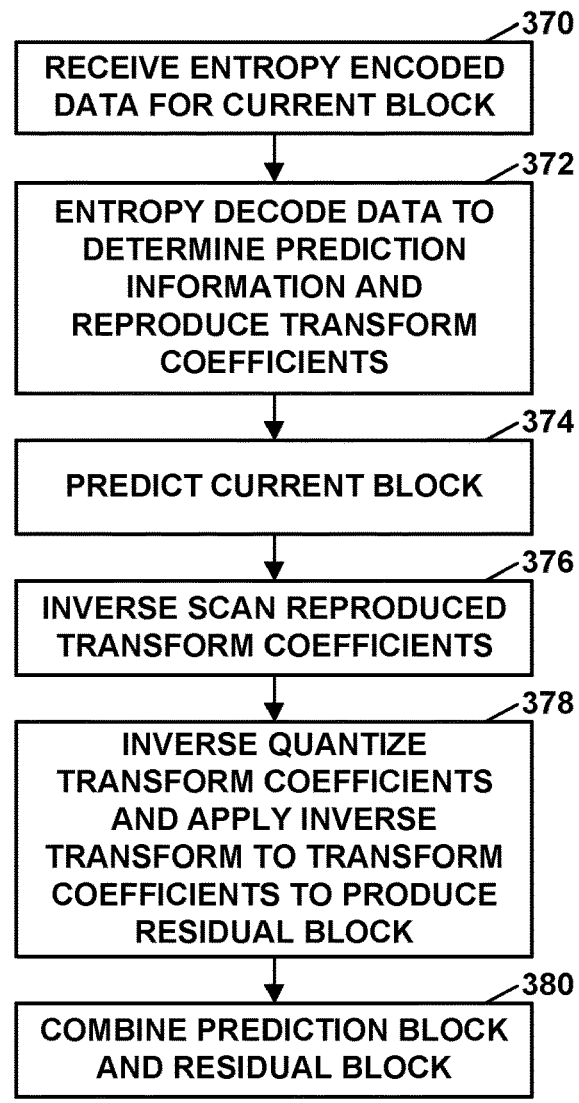
FIG. 14 is a flowchart illustrating an example method for decoding a current block in accordance with the techniques of this disclosure.

FIG. 14 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 14.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may, for example, form the prediction block using any of the various LIC and LMCS techniques described above. As part of predicting the current block, video decoder 300 may use the same prediction techniques as, or inverse prediction techniques of, those used in FIG. 12. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

By deriving LIC model parameters from a mapped domain reference template block and a mapped domain neighboring reconstruction template block, video decoder 300 may avoid loading an inverse mapping table from memory, thereby reducing decoding latency and increasing processing efficiency.

The following numbered clauses illustrate one or more aspects of the devices and techniques described in this disclosure.

Clause 1A. A method of coding video data, the method comprising: reshaping a pixel domain reference template block using a forward mapping function into a mapped domain reference template block; deriving local illumination compensation (LIC) model parameters from the mapped domain reference template block and a mapped domain neighboring reconstruction template block; applying the LIC model parameters to motion-compensated prediction signals; and coding the video data based on the application of the LIC model parameters.

Clause 2A. The method of clause 1A, wherein applying the LIC model parameters further comprises applying an integer shift.

Clause 3A. The method of clause 2A, wherein the integer shift is a right shift by 6.

Clause 4A. The method of clause 1A, wherein the motion-compensated prediction signals are in the pixel domain.

Clause 5A. The method of clause 1A, wherein the motion-compensated prediction signals are in the mapped domain.

Clause 6A. The method of clause 1A, wherein the forward mapping function comprises $FwdMap(Y\_pred)=((b2-b1)/(a2-a1))*(Y\_pred-a1)+b1$.

Clause 7A. The method of clause 1A, wherein the forward mapping function comprises a gamma function.

Clause 8A. The method of clause 7A, wherein the gamma function comprises $FwdMap(x)=A*x^r$, where A and r are constant values.

Clause 9A. The method of clause 1A, wherein the forward mapping function comprises a polynomial function.

Clause 10A. The method of clause 9A, wherein the polynomial function comprises FwdMap(x)=$\Sigma i \epsilon \{0,1, \ldots, n\}$ $a_i x^i$, where $a_i$ represents a real number which is a coefficient of the polynomial function of x.

Clause 11A. The method of clause 1A, further comprising: deriving an inverse mapping function based on the forward mapping function; and applying the inverse mapping function to reshape the mapped domain neighboring reconstruction template block.

Clause 12A. The method of any of clauses 1A-11A, wherein coding comprises decoding.

Clause 13A. The method of any of clauses 1A-12A, wherein coding comprises encoding.

Clause 14A. A device for coding video data, the device comprising one or more means for performing the method of any of clauses 1A-13A.

Clause 15A. The device of clause 14A, wherein the one or more means comprise one or more processors implemented in circuitry.

Clause 16A. The device of any of clauses 14A and 15A, further comprising a memory to store the video data.

Clause 17A. The device of any of clauses 14A-16A, further comprising a display configured to display decoded video data.

Clause 18A. The device of any of clauses 14A-17A, wherein the device comprises one or more of a camera, a computer, a mobile device, a broadcast receiver device, or a set-top box.

Clause 19A. The device of any of clauses 14A-18A, wherein the device comprises a video decoder.

Clause 20A. The device of any of clauses 14A-19A, wherein the device comprises a video encoder.

Clause 21A. A computer-readable storage medium having stored thereon instructions that, when executed, cause one or more processors to perform the method of any of clauses 1A-11A.

Clause 1B. A method of decoding video data, the method comprising: reshaping a pixel domain reference template block using a forward mapping function into a mapped domain reference template block; deriving local illumination compensation (LIC) model parameters from the mapped domain reference template block and a mapped domain neighboring reconstruction template block; applying the LIC model parameters to motion-compensated prediction signals; and decoding the video data based on the application of the LIC model parameters.

Clause 2B. The method of clause 1B, wherein applying the LIC model parameters further comprises applying an integer shift to the motion-compensated prediction signals.

Clause 3B. The method of clause 2B, wherein the integer shift is a right shift by 6.

Clause 4B. The method of any of clauses 1B-3B, wherein the motion-compensated prediction signals are in a pixel domain.

Clause 5B. The method of any of clauses 1B-3B, wherein the motion-compensated prediction signals are in a mapped domain.

Clause 6B. The method of any of clauses 1B-5B, wherein the forward mapping function comprises: FwdMap (Y_pred)=((b2−b1)/(a2−a1))*(Y_pred−a1)+b1, where Y_pred is a luma prediction signal, i is a piece index, a1 is an input pivot point of i, a2 is an input pivot point of i+1, b1 is a mapped pivot point of i, and b2 is a mapped pivot point of i+1.

Clause 7B. The method of any of clauses 1B-5B, wherein the forward mapping function comprises a gamma function.

Clause 8B. The method of clause 7B, wherein the gamma function comprises: FwdMap(x)=A*xr, where A and r are constant values.

Clause 9B. The method of any of clauses 1B-5B, wherein the forward mapping function comprises a polynomial function.

Clause 10B. The method of clause 9B, wherein the polynomial function comprises FwdMap(x)=$\Sigma i \epsilon \{0,1, \ldots, n\}$ $a_i x^i$, where $a_i$ represents a real number which is a coefficient of the polynomial function of x.

Clause 11B. The method of any of clauses 1B-10B, wherein the LIC model parameters are applied on a coding unit (CU) basis.

Clause 12B. The method of clause 11B, further comprising: determining that luma mapping with chroma scaling is enabled for the CU.

Clause 13B. A device for decoding video data, the device comprising: memory configured to store the video data; and one or more processors implemented in circuitry and communicatively coupled to the memory, the one or more processors being configured to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

Clause 14B. The device of clause 13B, wherein as part of applying the LIC model parameters, the one or more processors are further configured to: apply an integer shift to the motion-compensated prediction signals.

Clause 15B. The device of clause 14B, wherein the integer shift is a right shift by 6.

Clause 16B. The device of any of clauses 13B-15B, wherein the motion-compensated prediction signals are in a pixel domain.

Clause 17B. The device of any of clauses 13B-15B, wherein the motion-compensated prediction signals are in a mapped domain.

Clause 18B. The device of any of clauses 13B-17B, wherein the forward mapping function comprises: FwdMap (Y_pred)=((b2−b1)/(a2−a1))*(Y_pred−a1)+b1, where Y_pred is a luma prediction signal, i is a piece index, a1 is an input pivot point of i, a2 is an input pivot point of i+1, b1 is a mapped pivot point of i, and b2 is a mapped pivot point of i+1.

Clause 19B. The device of any of clauses 13B-17B, wherein the forward mapping function comprises a gamma function.

Clause 20B. The device of clause 19B, wherein the gamma function comprises: FwdMap(x)=A*xr, where A and r are constant values.

Clause 21B. The device of any of clauses 13B-178B, wherein the forward mapping function comprises a polynomial function.

Clause 22B. The device of clause 21B, wherein the polynomial function comprises: FwdMap(x)=$\Sigma i \epsilon \{0,1, \ldots, n\}$ $a_i x^i$, where $a_i$ represents a real number which is a coefficient of the polynomial function of x Clause 23B. The device of any of clauses 13B-22B, wherein the one or more processors apply the LIC model parameters on a coding unit (CU) basis.

Clause 24B. The device of clause 23B, wherein the one or more processors are further configured to: determine that luma mapping with chroma scaling is enabled for the CU.

Clause 25B. The device of any of clauses 13B-24B, further comprising: a display configured to display the video data.

Clause 26B. The device of any of clauses 13B-25B, further comprising: a camera configured to capture the video data.

Clause 27B. The device of any of clauses 13B-26B, wherein the device comprises a mobile telephone.

Clause 28B. A non-transitory computer readable storage medium having instructions stored thereon which, when executed, cause one or more processors to: reshape a pixel domain reference template block using a forward mapping function into a mapped domain reference template block; derive local illumination compensation (LIC) model parameters from the mapped domain reference template block and a mapped domain neighboring reconstruction template block; apply the LIC model parameters to motion-compensated prediction signals; and decode the video data based on the application of the LIC model parameters.

Clause 29B. A device for decoding video data, the device comprising: means for reshaping a pixel domain reference template block using a forward mapping function into a mapped domain reference template block; means for deriving local illumination compensation (LIC) model parameters from the mapped domain reference template block and a mapped domain neighboring reconstruction template block; means for applying the LIC model parameters to motion-compensated prediction signals; and means for decoding the video data based on the application of the LIC model parameters.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

reshaping a pixel domain reference template block using a forward mapping function into a mapped domain reference template block, wherein the forward mapping function comprises:

$$\text{FwdMap}(Y\_pred) = ((b2-b1)/(a2-a1)) * (Y\_pred - a1) + b1,$$

where Y_pred is a luma prediction signal, i is a piece index, a1 is an input pivot point of i, a2 is an input pivot point of i+1, b1 is a mapped pivot point of i, and b2 is a mapped pivot point of i+1;

deriving local illumination compensation (LIC) model parameters from the mapped domain reference template block and a mapped domain neighboring reconstruction template block;

applying the LIC model parameters to motion-compensated prediction signals; and decoding the video data based on the application of the LIC model parameters.

2. The method of claim 1, wherein applying the LIC model parameters further comprises applying an integer shift to the motion-compensated prediction signals.

3. The method of claim 2, wherein the integer shift is a right shift by 6.

4. The method of claim 1, wherein the motion-compensated prediction signals are in a pixel domain.

5. The method of claim 1, wherein the motion-compensated prediction signals are in a mapped domain.

6. The method of claim 1, wherein the LIC model parameters are applied on a coding unit (CU) basis.

7. The method of claim 1, further comprising:
determining that luma mapping with chroma scaling is enabled for the CU.

8. A device for decoding video data, the device comprising:
memory configured to store the video data; and
one or more processors implemented in circuitry and communicatively coupled to the memory, the one or more processors being configured to:
reshape a pixel domain reference template block using a forward mapping function into a mapped domain reference template block, wherein the forward mapping function comprises:

$$\mathrm{FwdMap}(Y\_pred)=((b2-b1)/(a2-a1))^* (Y\_pred-a1)+b1,$$

where Y_pred is a luma prediction signal, i is a piece index, a1 is an input pivot point of i, a2 is an input pivot point of i+1, b1 is a mapped pivot point of i, and b2 is a mapped pivot point of i+1;
derive local illumination compensation (LIC) model parameters from the mapped domain reference template block and a mapped domain neighboring reconstruction template block;
apply the LIC model parameters to motion-compensated prediction signals; and
decode the video data based on the application of the LIC model parameters.

9. The device of claim 8, wherein as part of applying the LIC model parameters, the one or more processors are further configured to:
apply an integer shift to the motion-compensated prediction signals.

10. The device of claim 9, wherein the integer shift is a right shift by 6.

11. The device of claim 8, wherein the motion-compensated prediction signals are in a pixel domain.

12. The device of claim 8, wherein the motion-compensated prediction signals are in a mapped domain.

13. The device of claim 8, wherein the one or more processors apply the LIC model parameters on a coding unit (CU) basis.

14. The device of claim 13, wherein the one or more processors are further configured to:
determine that luma mapping with chroma scaling is enabled for the CU.

15. The device of claim 8, further comprising:
a display configured to display the video data.

16. The device of claim 8, further comprising:
a camera configured to capture the video data.

17. The device of claim 8, wherein the device comprises a mobile telephone.

18. A non-transitory computer readable storage medium having instructions stored thereon which, when executed, cause one or more processors to:
reshape a pixel domain reference template block using a forward mapping function into a mapped domain reference template block, wherein the forward mapping function comprises:

$$\mathrm{FwdMap}(Y\_pred)=((b2-b1)/(a2-a1))^* (Y\_pred-a1)+b1,$$

where Y_pred is a luma prediction signal, i is a piece index, a1 is an input pivot point of i, a2 is an input pivot point of i+1, b1 is a mapped pivot point of i, and b2 is a mapped pivot point of i+1;
derive local illumination compensation (LIC) model parameters from the mapped domain reference template block and a mapped domain neighboring reconstruction template block;
apply the LIC model parameters to motion-compensated prediction signals; and
decode the video data based on the application of the LIC model parameters.

19. The non-transitory computer readable storage medium of claim 18, wherein as part of applying the LIC model parameters, the instructions cause the one or more processors to:
apply an integer shift to the motion-compensated prediction signals.

20. A device for decoding video data, the device comprising:
means for reshaping a pixel domain reference template block using a forward mapping function into a mapped domain reference template block, wherein the forward mapping function comprises:

$$\mathrm{FwdMap}(Y\_pred)=((b2-b1)/(a2-a1))^* (Y\_pred-a1)+b1,$$

where Y_pred is a luma prediction signal, i is a piece index, a1 is an input pivot point of i, a2 is an input pivot point of i+1, b1 is a mapped pivot point of i, and b2 is a mapped pivot point of i+1;
means for deriving local illumination compensation (LIC) model parameters from the mapped domain reference template block and a mapped domain neighboring reconstruction template block;
means for applying the LIC model parameters to motion-compensated prediction signals; and
means for decoding the video data based on the application of the LIC model parameters.

* * * * *